United States Patent
Ishii et al.

(10) Patent No.: US 8,308,224 B2
(45) Date of Patent: Nov. 13, 2012

(54) COWL TOP PANEL AND FRONT VEHICLE BODY STRUCTURE FOR AUTOMOBILE

(75) Inventors: Kenji Ishii, Aichi (JP); Keita Ishihara, Aichi (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 115 days.

(21) Appl. No.: 12/673,331

(22) PCT Filed: Jan. 27, 2009

(86) PCT No.: PCT/JP2009/051252
§ 371 (c)(1),
(2), (4) Date: Feb. 12, 2010

(87) PCT Pub. No.: WO2009/101854
PCT Pub. Date: Aug. 20, 2009

(65) Prior Publication Data
US 2011/0285173 A1 Nov. 24, 2011

(30) Foreign Application Priority Data

Feb. 15, 2008 (JP) .................................. 2008034753

(51) Int. Cl.
*B60J 7/00* (2006.01)
(52) U.S. Cl. ...................................................... 296/192
(58) Field of Classification Search .................... 296/192
See application file for complete search history.

(56) References Cited

U.S. PATENT DOCUMENTS 6,869,134 B2   3/2005   Kato et al.
7,004,534 B2*  2/2006   Yoshii et al. ................... 296/192

FOREIGN PATENT DOCUMENTS

JP   P11-115811       4/1999
JP   2003-276641 A   10/2003
JP   2004-142647      5/2004

(Continued)

OTHER PUBLICATIONS

English Translation of International Preliminary Report on Patentability for International (PCT) Application No. PCT/JP2009/051252, mailed Oct. 5, 2010.

(Continued)

*Primary Examiner* — Joseph Pape
(74) *Attorney, Agent, or Firm* — Sheridan Ross P.C.

(57) ABSTRACT

A main bent portion 25 is formed at a center portion of a cowl top outer panel 14 with respect to a vehicle longitudinal direction so as to extend linearly along a vehicle widthwise direction. The main bent portion 25 is formed by a lower flange portion 18, an upright portion 19 and a lower flat portion 20. The lower flange portion 18 and the upright portion 19 are perpendicular to each other, and the upright portion 19 and the lower flat portion 20 are perpendicular to each other. A lower flange portion 18, a lower flat portion 20 and an upper slanted portion 23 are provided to the cowl top outer panel 14 so as to support a front end portion and a rear end portion of a first bracket 27 and a second bracket 28 of a wiper unit 30. The lower flange portion 18, the lower flat portion 20 and the upper slanted portion 23 are arranged in this order along the vehicle longitudinal direction of the main bent portion 25.

6 Claims, 5 Drawing Sheets

FOREIGN PATENT DOCUMENTS

| | | |
|---|---|---|
| JP | 2004-330939 | 11/2004 |
| JP | 2006-123676 A | 5/2006 |
| JP | 2007-331710 | 12/2007 |

OTHER PUBLICATIONS

Official Action with English translation for China Patent Application No. 200980100294.2, dated Jul. 26, 2011, 8 pages.

International Search Report prepared by the Japanese Patent Office on Apr. 14, 2009, for International Application No. PCT/JP2009/051252.

Official Action for Japan Patent Application No. 2008-034753, dated May 15, 2012, 3 pages.

\* cited by examiner

COWL TOP PANEL AND FRONT VEHICLE BODY STRUCTURE FOR AUTOMOBILE

CROSS REFERENCE TO RELATED APPLICATIONS

This application is a national stage application under 35 U.S.C. 371 of PCT Application No. PCT/JP2009/051252 having an international filing date of 27 Jan. 2009, which designated the United States, which PCT application claimed the benefit of Japanese Patent Application No. 2008-034753 2008 filed Feb. 15, 2008, the entire disclosure of each of which are hereby incorporated herein by reference.

FIELD OF THE INVENTION

The present invention relates to a cowl top panel on which a wiper unit is mounted and a front vehicle body structure for an automobile provided with the cowl top panel.

BACKGROUND OF THE INVENTION

A cowl top panel is provided in an upper area closer to an engine compartment at the border between the engine compartment and the passenger compartment in a front vehicle body for an automobile. The cowl top panel is provided at the lower end of the front shield. Generally, a wiper unit is mounted on the cowl top panel.

For example, as shown in FIG. 5, the front vehicle body structure disclosed in Patent Document 1 has a first cowl 51 that is provided between left and right front pillars 50 and a second cowl 53 that is provided between left and right apron upper members 52 at the front side of the first cowl 51. The second cowl 53 has a U-shaped cross section, opens upwardly, and extends linearly. Left and right end portions of the second cowl 53 are connected to an upper surface of the left and right apron upper members 52 and top surfaces of left and right suspension towers 54 with bolts. The second cowl 53 increases rigidity of the front vehicle body portion and suppresses vibration and noise caused in the front vehicle body portion due to the vibration of tires when the vehicle moves. Patent Document 1 has no disclosure whatsoever regarding a wiper unit.

A front vehicle body structure disclosed in Patent Document 2 has a cowl top rear 60 and a cowl top front 61 as shown in FIG. 6. The cowl top rear 60 is provided between left and right front pillars. The cowl top front 61 is provided between left and right apron upper members at the front side of the cowl top rear 60. A wiper support portion 62 is formed at either end portion of the cowl top rear 60. Bottom portions of the wiper support portion 62 are connected to top portions of the left and right suspension towers 63. A wiper unit of an overlap type (not shown) is mounted to the wiper support portions 62. That is, the wiper unit has a pair of pivot shafts that are arranged with a great distance therebetween and a pair of wiper blades that are rotated in opposite directions.

Generally, when a wiper unit is operated, great bending moment is repeatedly applied to the cowl top panel from the wiper unit. The bending moment is based on reaction force received by the wiper blade from a wiped surface and load that is applied to the wiper unit by inertia caused when a rotation direction of a wiper motor is switched and the wiper motor is stopped. Therefore, if the cowl top panel does not have enough bending rigidity with respect to the vehicle widthwise direction, the operation of the wiper unit is unstable. Accordingly, the wiping operation of the wiper may not be executed appropriately or abnormal noise may be caused. In the structure disclosed in Patent Document 2, since each of the two end portions of the cowl top rear 60 is fixed to each of the top portions of the suspension towers 63, the cowl top rear 60 is hardly deformed.

However, wiper units that are generally used are not overlap type that is used for the structure disclosed in Patent Document 2, but the tandem type. In the wiper unit of the tandem type, the pivot shafts of a pair of wiper blades are provided at a center portion with respect to the vehicle widthwise direction so as to be close to each other and the wiper blades are rotated in the same direction. It is difficult to arrange the wiper unit of the tandem type at two end portions of the cowl top rear 60 disclosed in Patent Document 2. Further, unlike the second cowl 53 disclosed in Patent Document 1, the cowl top 60 disclosed in Patent Document 2 is not formed to extend linearly along the vehicle widthwise direction. This hardly increases the rigidity of the front vehicle body portion.

Patent Document 1: Japanese Laid-Open Patent Publication No. 11-115811

Patent Document 2: Japanese Laid-Open Patent Publication No. 2004-330939

SUMMARY OF THE INVENTION

An objective of the present invention is to provide a cowl top panel that increases the rigidity of a front vehicle body portion thereby improving the steering stability and the riding comfort and increasing the supporting rigidity for a wiper unit, and to provide a front vehicle body structure provided with the cowl top panel. Another objective of the present invention is to provide a cowl top panel that enlarges the space of an engine compartment and a front vehicle body structure provided with the cowl top panel.

To solve the above problems, one aspect of the present invention provides a cowl top panel that has an upper surface on which a wiper unit is mounted with a bracket, and is mounted in an automobile. A main bent portion for reinforcement is formed at a center portion of the cowl top panel with respect to a vehicle longitudinal direction so as to extend linearly along a vehicle widthwise direction. A support portion for supporting a front end portion and a rear end portion of the bracket of the wiper unit is provided at a front portion and a rear portion of the main bent portion with respect to the vehicle longitudinal direction, respectively.

It is preferable that a fixing portion be provided on each end of the cowl top panel so as to fix the cowl top panel to upper ends of suspension towers of the automobile.

Another aspect of the present invention provides a front vehicle body structure, in which the cowl top panel is fixed to top portions of left and right suspension towers by the fixing portions provided at both ends of the cowl top panel, and a bracket of the wiper unit is supported to the support portion.

It is preferable that an auxiliary bent portion be formed on the cowl top panel and adjacent to the main bent portion so as to extend along a vehicle widthwise direction, and that the bracket be provided so as to extend over the main bent portion and the auxiliary bent portion.

It is preferable that the bracket include a first bracket that is provided so as to extend over the auxiliary bent portion and a second bracket that is provided between the first bracket and the cowl top panel so as to extend over the main bent portion.

It is preferable that the auxiliary bent portion be formed like steps along the vehicle longitudinal direction.

According to the above-described structure, the bending rigidity is imparted to the cowl top panel by the linear main bent portion for reinforcement. The end portions of the cowl top panel are connected to the top portions of the left and right suspension towers. This increases the rigidity of the vehicle body front portion without increasing the number of parts. This simplifies the structure of the cowl top panel and the vehicle front body mechanism, and reduces the occupied space in the engine compartment. Additionally, the wiper unit is supported to the cowl top panel with the bracket that is fixed thereto so as to extend over both of the main bent portion and the auxiliary bent portion. This suppresses deformation of the cowl top panel even if bending moment is applied to the cowl top panel from the wiper unit.

According to the present invention, the rigidity of the vehicle front body portion is increased, and the steering stability and riding comfort are improved. The supporting rigidity for the wiper unit is improved, and the space in the engine compartment is enlarged.

BRIEF DESCRIPTION OF DRAWINGS

FIG. 4(*b*) is a cross-sectional view taken along a line 4*b*-4*b* in FIG. 4(*a*);

DETAILED DESCRIPTION OF THE PREFERRED EMBODIMENTS

Next, a cowl top panel and a front vehicle body structure provided with the cowl top panel according to one embodiment of the present invention will be explained with reference to FIGS. 1 to 4.

Figure 2:
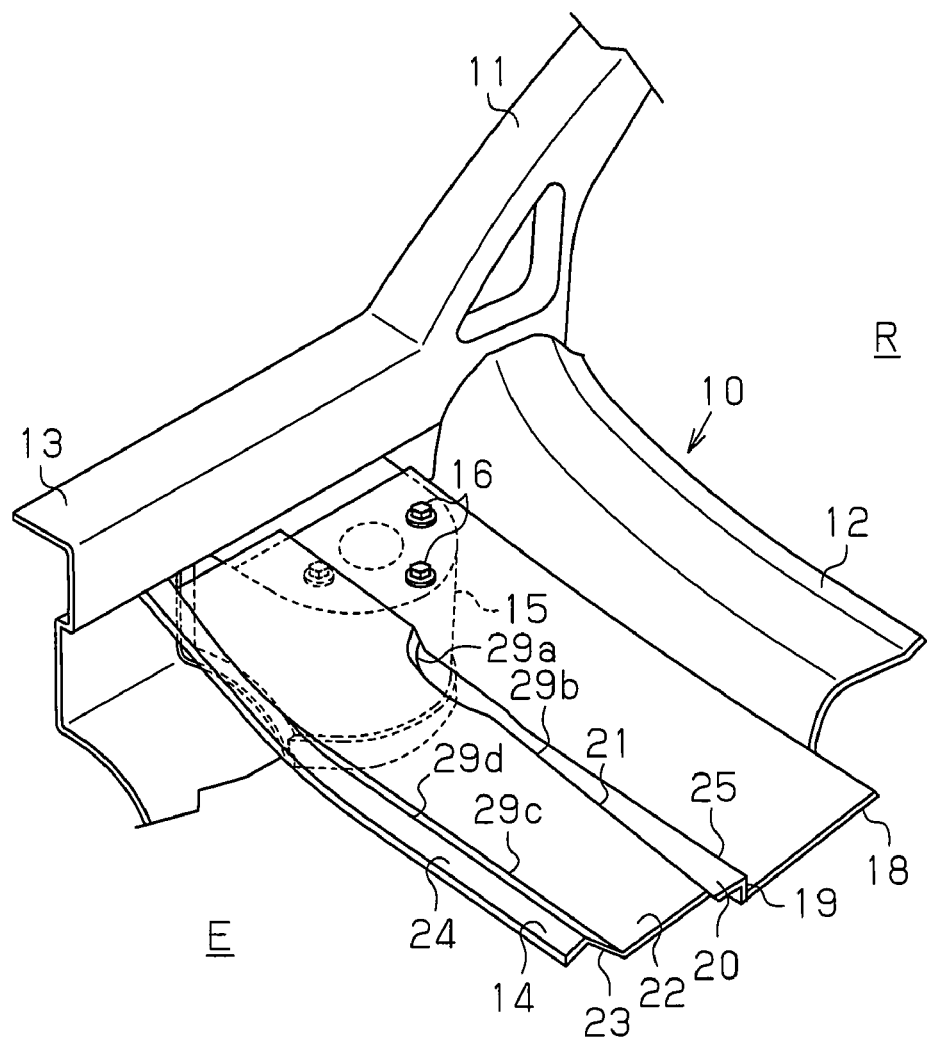
FIG. 2 is a perspective view showing a part of a front vehicle body portion.

As shown in FIG. 2, a cowl top panel 10 is provided between an engine compartment E and a passenger compartment R of the front vehicle body portion of an automobile. The cowl top panel 10 is positioned at the lower end of the front shield. The cowl top panel 10 is provided with a cowl top inner panel 12 and a cowl top outer panel 14. The cowl top inner panel 12 is provided between left and right front pillars 11. The cowl top outer panel 14 is provided at the front side of the cowl top inner panel 12. A left end portion and a right end portion of the cowl top outer panel 14 are connected to top portions of left and right front suspension towers 15 with a plurality of bolts 16. FIG. 2 shows a right side of the vehicle body.

Figure 3:
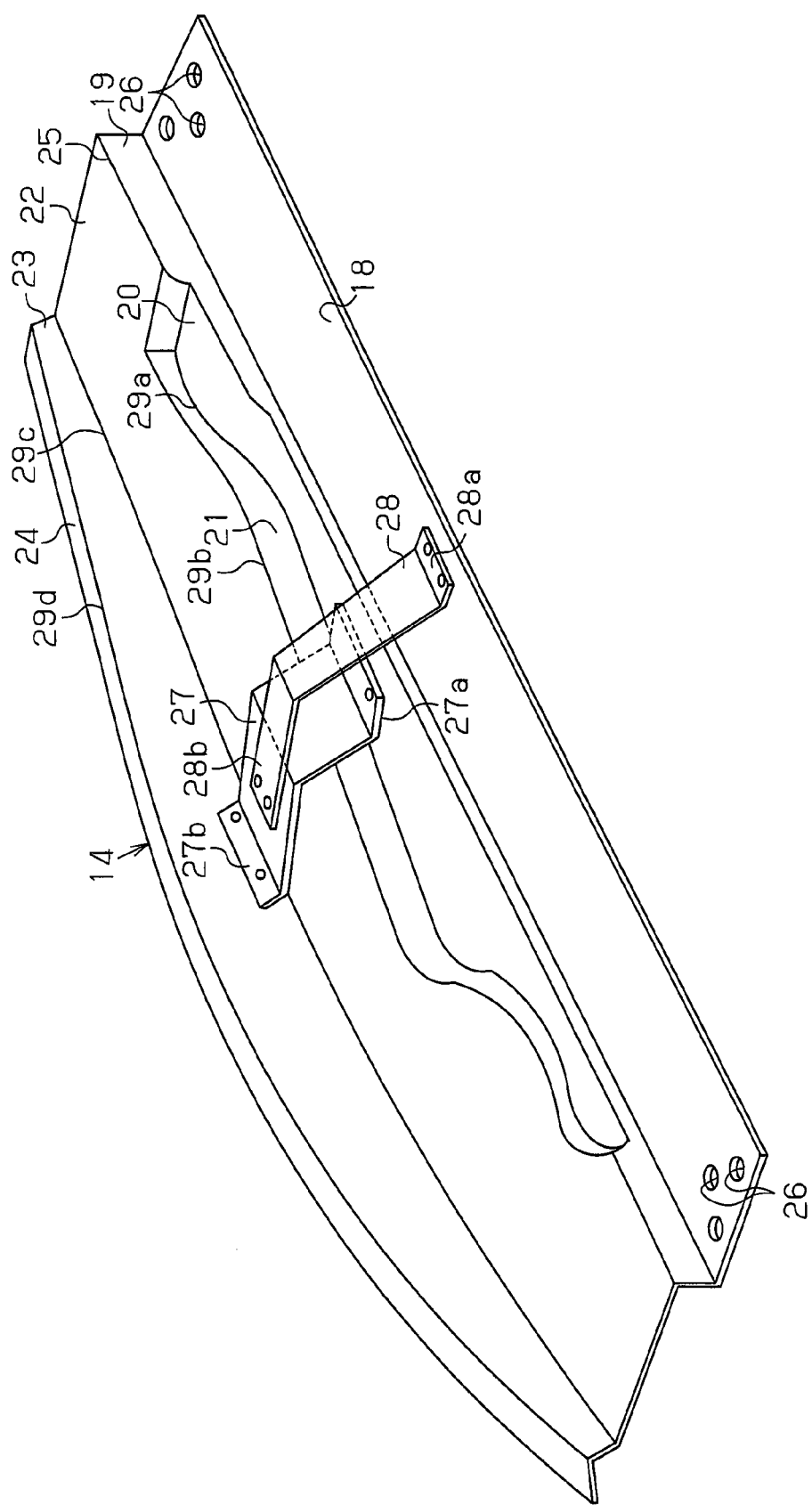
FIG. 3 is a perspective view showing a cowl top outer panel of a vehicle body.
Figure 4A:
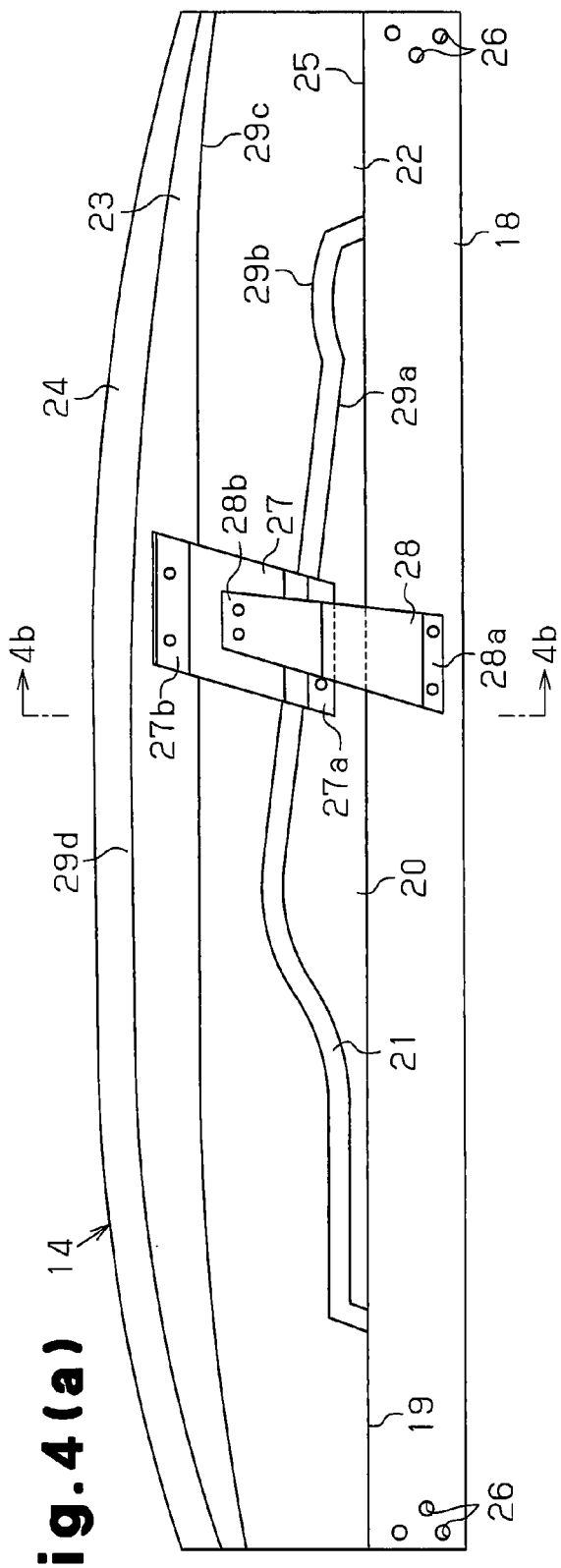
FIG. 4(*a*) is a plan view showing the cowl top outer panel.
Figure 4B:
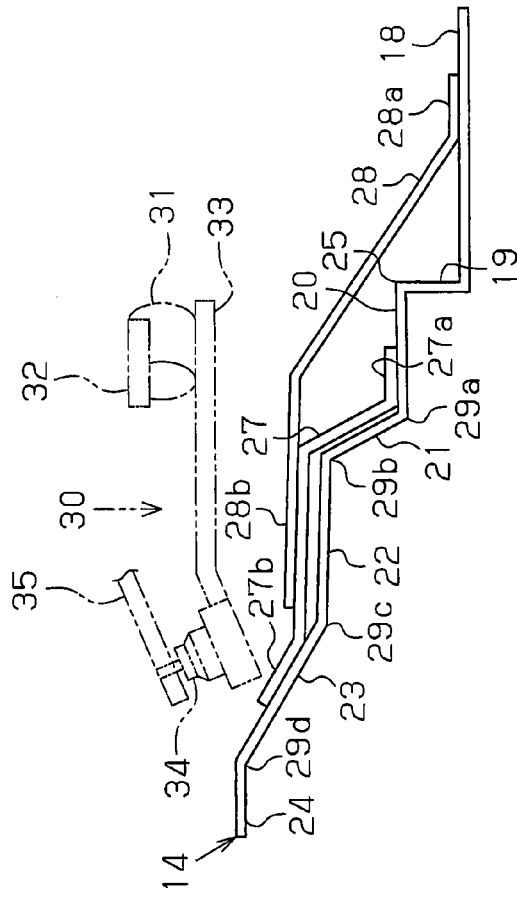
Figure 5:
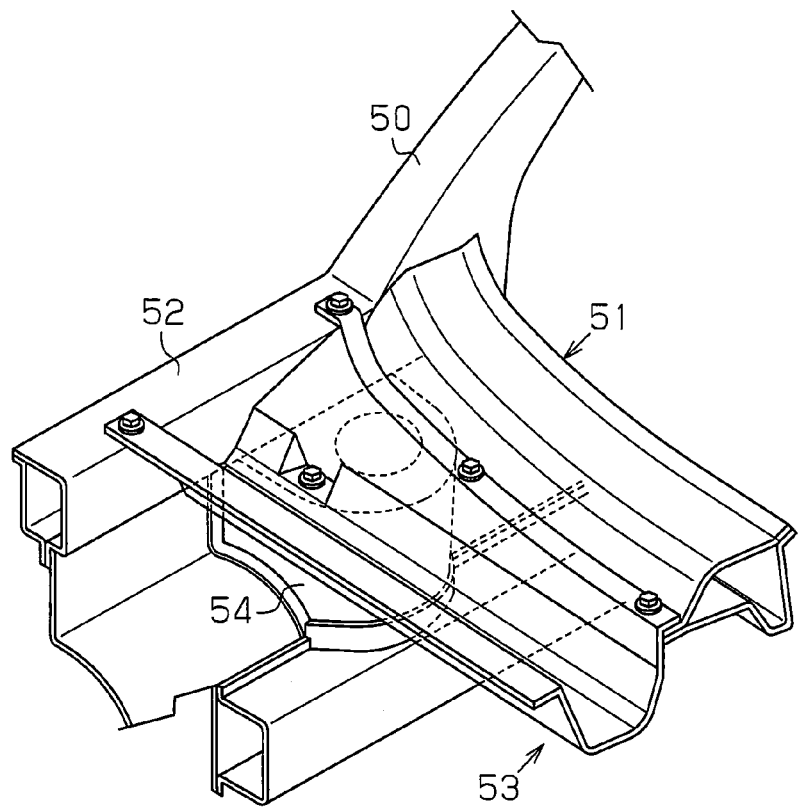
FIG. 5 is a perspective view showing a prior art front vehicle body structure.
Figure 6:
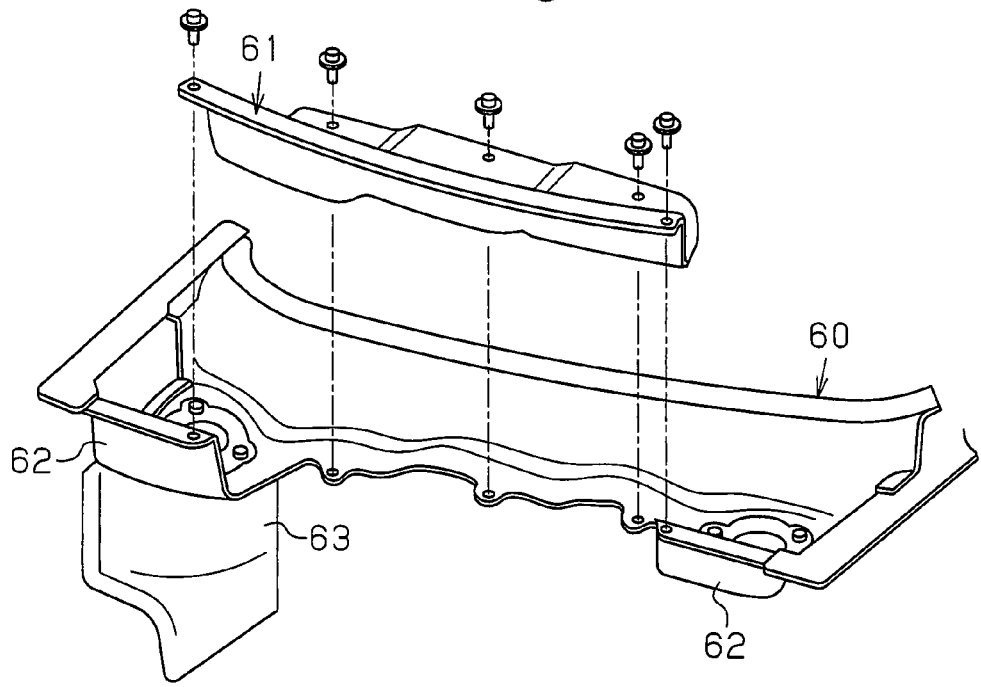
FIG. 6 is a perspective view showing another prior art front vehicle body structure.

As shown in FIGS. 3, 4(*a*) and 4(*b*), the cowl top outer panel 14 is bent in a plurality of steps along the vehicle longitudinal direction so as to have bending rigidity with respect to the vehicle longitudinal direction, the vehicle widthwise direction, and the vertical direction. That is, the cowl top outer panel 14 has a lower flange portion 18, an upright portion 19, a lower flat portion 20, a lower slanted portion 21, an upper flat portion 22, an upper slanted portion 23, and an upper flange portion 24, which are formed by bending and arranged in the order along the longitudinal direction of the vehicle. The lower flange portion 18 and the lower flat portion 20 are arranged on two horizontal planes that are substantially parallel to each other, and the upright portion 19 is arranged on a substantially vertical plane. The lower flange portion 18 and the upright portion 19 make a right angle. The lower flat portion 20 is bent at a right angle with respect to the upright portion 19. The lower flange portion 18, the upright portion 19 and the lower flat portion 20 form a main bent portion 25 for reinforcement that extends linearly along the vehicle widthwise direction.

The lower flat portion 20 and the lower slanted portion 21 form a first auxiliary bent portion 29*a* for reinforcement. The lower slanted portion 21 and the upper flat portion 22 form a second auxiliary bent portion 29*b* for reinforcement. The upper flat portion 22 and the upper slanted portion 23 form a third auxiliary bent portion 29*c* for reinforcement. The upper slanted portion 23 and the upper flange portion 24 form a fourth auxiliary bent portion 29*d* for reinforcement. The upright portion 19 is formed in a linear shape with a plan view with respect to the cowl top outer panel 14, as shown in FIG. 4(*a*). A plurality of openings 26 are formed at two end portions of the cowl top outer panel 14 as a fixing portion where the bolts 16 are inserted.

As shown in FIGS. 3, 4(*a*), 4(*b*), a first bracket 27 and a second bracket 28 are fixed at a center portion on an upper surface of the cowl top outer panel 14 with respect to the vehicle widthwise direction so as to receive the wiper unit 30. The first bracket 27 is arranged to extend over the second auxiliary bent portion 29*b* that is comprised of the lower slanted portion 21 and the upper flat portion 22. The first bracket 27 extends along the vehicle longitudinal direction and has a rear end portion 27*a* and a front end portion 27*b*. The rear end portion 27*a* and the front end portion 27*b* of the first bracket 27 are spot-welded to the lower flat portion 20 and the upper slanted portion 23, respectively. The second bracket 28 is arranged to extend over the upright portion 19, the lower flat portion 20 and the lower slanted portion 21. The second bracket 28 extends along the vehicle longitudinal direction and has a rear end portion 28*a* and a front end portion 28*b*. The rear end portion 28*a* and the front end portion 28*b* of the second bracket 28 are spot-welded to the lower flange portion 18 and the first bracket 27, respectively. That is, the second bracket 28 is arranged to extend over the main bent portion 25 and the first and second auxiliary bent portions 29*a*, 29*b* that are closer to the main bent portion 25.

The wiper unit 30 is fixed to the cowl top outer panel 14 with the second bracket 28. That is, the wiper unit 30 is supported by the front and rear end portions 28*b*, 28*a* of the second bracket 28 that is provided so as to extend over the main bent portion 25 and the first and second auxiliary bent portions 29*a*, 29*b* that are next to the main bent portion 25.

Figure 1:
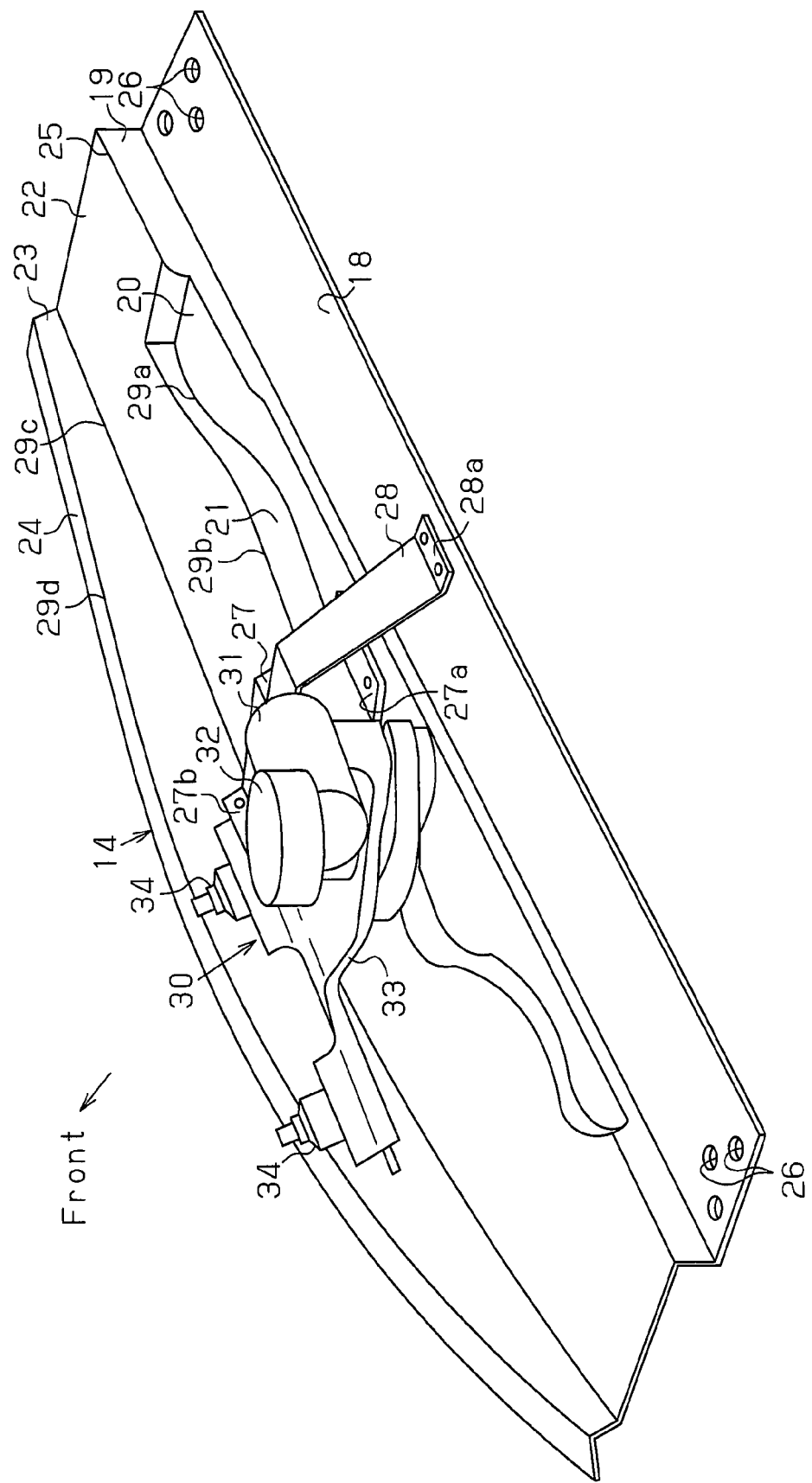
FIG. 1 is a perspective view showing a front vehicle body structure according to one embodiment of the present invention.

In the present embodiment, the lower flange portion 18, the lower flat portion 20, and the upper slanted portion 23 form a support portion. The wiper unit 30 is a tandem type and comprised of a DC motor 31, a reduction gear portion 32, a power transmission portion 33, and a pair of pivot shaft portions 34, as shown in FIGS. 1 and 4(*b*). A wiper blade 35 shown in FIG. 4(*b*) is provided to each of the pivot shaft portions 34.

While the vehicle is running, forces are applied to the left and right front suspension towers 15 in various directions according to the operation of the front suspensions (not shown). The top portions of the left and right front suspension towers 15 are connected to each other by the cowl top outer panel 14 having the main bent portion 25 that extends linearly along the vehicle widthwise direction. This suppresses deformation of the vehicle front body portion while the vehicle is running. This improves the steering stability and riding comfort, and also suppresses generation of noise caused by the deformation of the vehicle front body portion.

While the wiper unit 30 is operated, bending moments in the vehicle widthwise direction and the vehicle longitudinal direction are repeatedly applied to the cowl top outer panel 14 from the wiper unit 30 through the first bracket 27 and the second bracket 28. However, bending rigidity with respect to the vertical direction is imparted to the cowl top outer panel 14 by the main bent portion 25 and the first to fourth auxiliary bent portions 29a to 29d, especially from the main bent portion 25.

In addition, the wiper unit 30 is supported to the cowl top outer panel 14 with the first bracket 27 and the second bracket 28, which are fixed to extend over the main bent portion 25 and the first and second auxiliary bent portions 29a, 29b. Therefore, the first bracket 27 and the second bracket 28 have reinforcement effects with respect to the cowl top outer panel 14. Accordingly, even if the cowl top outer panel 14 receives bending moments from the wiper unit 30, the cowl top outer panel 14 is hardly bent in the vertical direction and the wiper unit 30 is stably supported. Therefore, the operation of the wiper unit 30 does not become unstable, the wiping operation by the wiper blade 35 is prevented from being inappropriate, and no abnormal noise is generated.

The vehicle front body mechanism of the present embodiment has following advantages.

(1) The bending rigidity of the cowl top outer panel 14 with respect to the vertical direction is improved by the main bent portion 25, which extends linearly along the vehicle widthwise direction at the center portion with respect to the vehicle longitudinal direction. Each of the two end portions of the cowl top outer panel 14 is connected to each top portion of the left and right front suspension towers 15. Accordingly, the left and right front suspension towers 15 are connected to each other by the cowl top outer panel 14. This increases the rigidity of the vehicle body. This suppresses the deformation of the vehicle front body portion while the vehicle is running and improves the steering stability and riding comfort. This also suppresses generation of noise caused at the front vehicle body portion.

(2) The cowl top outer panel 14 is formed so as to connect the left and right apron upper members 13 linearly. Therefore, the cowl top outer panel 14 is appropriate to receive a general wiper unit 30 of a tandem type.

(3) The wiper unit 30 is supported to the cowl top outer panel 14 with the first bracket 27 and the second bracket 28, which are fixed to extend over the main bent portion 25, and the first and second auxiliary bent portions 29a, 29b. This effectively increases the rigidity of the cowl top outer panel 14 with respect to the bending moment that is applied from the wiper unit 30. This increases the rigidity of the vehicle body similarly to the advantage (2). Further, the improvement of the supporting rigidity of the cowl top outer panel 14 for the wiper unit 30 stabilizes the wiping operation of the wiper blade 35 and prevents the occurrence of the abnormal noise due to the wiping operation.

(4) Since the main bent portion 25 is integrally formed at the center portion of the cowl top outer panel 14 with respect to the vehicle longitudinal direction, the number of parts is not increased. Thus, the space in the engine compartment E is not reduced due to the parts provided to the cowl top outer panel 14. This prevents the limitation of arrangement of auxiliary parts in the engine compartment E and reduces the weight of the vehicle.

The present invention may be modified as described below.

The number of the flat portions and the slanted portions comprising the upright portion 19 and the first to fourth auxiliary bent portions 29a to 29d may be changed. That is, the number of the auxiliary bent portions may be changed.

The first bracket 27 may be omitted and the front end portion 28b of the second bracket 28 may be fixed directly to the cowl top outer panel 14.

The main bent portion 25 may be bent at any angle other than 90 degrees. For example, the upright portion 19 may make an acute angle with the lower flange portion 18 or the lower flat portion 20.

The number of the main bent portions 25 may be changed. That is, the upright portion 19 may be provided at several portions.

The invention claimed is:

1. A cowl top outer panel located at a front side of a cowl top inner panel, the cowl top outer panel having an upper surface on which a wiper unit is mounted with a bracket and being mounted in an automobile, wherein a main bent portion for reinforcement is formed at a center portion of the cowl top outer panel with respect to a vehicle longitudinal direction so as to extend linearly along a vehicle widthwise direction, and a support portion for supporting a front end portion and a rear end portion of the bracket of the wiper unit is provided at a front portion and a rear portion of the main bent portion with respect to the vehicle longitudinal direction, and wherein an auxiliary bent portion is formed on the cowl top outer panel and adjacent to the main bent portion so as to extend along a vehicle widthwise direction, and the bracket is provided so as to extend over the main bent portion and the auxiliary bent portion, and wherein the main and auxiliary bent portions form a step-like shape including steps that rise toward the front in the vehicle longitudinal direction.

2. The cowl top outer panel according to claim 1, wherein a fixing portion is provided on each end of the cowl top outer panel so as to fix the cowl top panel to upper ends of suspension towers of the automobile.

3. A front vehicle body structure, wherein the cowl top outer panel according to claim 2 is fixed to top portions of left and right suspension towers by the fixing portions provided at both ends of the cowl top outer panel, and the bracket of the wiper unit is supported to the support portion.

4. The front vehicle body structure according to claim 3, wherein the bracket includes a first bracket that is provided so as to extend over the auxiliary bent portion and a second bracket that is provided between the first bracket and the cowl top outer panel so as to extend over the main bent portion.

5. The cowl top panel according to claim 1, wherein the step-like shape is formed by a lower flange portion, a substantially upright portion, a lower flat portion, a lower slanted portion, an upper flat portion, an upper slanted portion, and an upper flange portion.

6. The cowl top panel according to claim 1, wherein the main bent portion comprises an angle of approximately 90 degrees and the auxiliary bent portion comprises an angle of greater than 90 degrees.

\* \* \* \* \*